Dec. 30, 1952 V. C. KENNEDY ET AL 2,623,936
DIGITAL COUNTING APPARATUS
Filed Dec. 3, 1949 2 SHEETS—SHEET 1

INVENTORS:
Verne C. Kennedy and
Verne C. Kennedy Jr.,
BY Dawson, Ormes, Broth and Spangenberg,
ATTORNEYS.

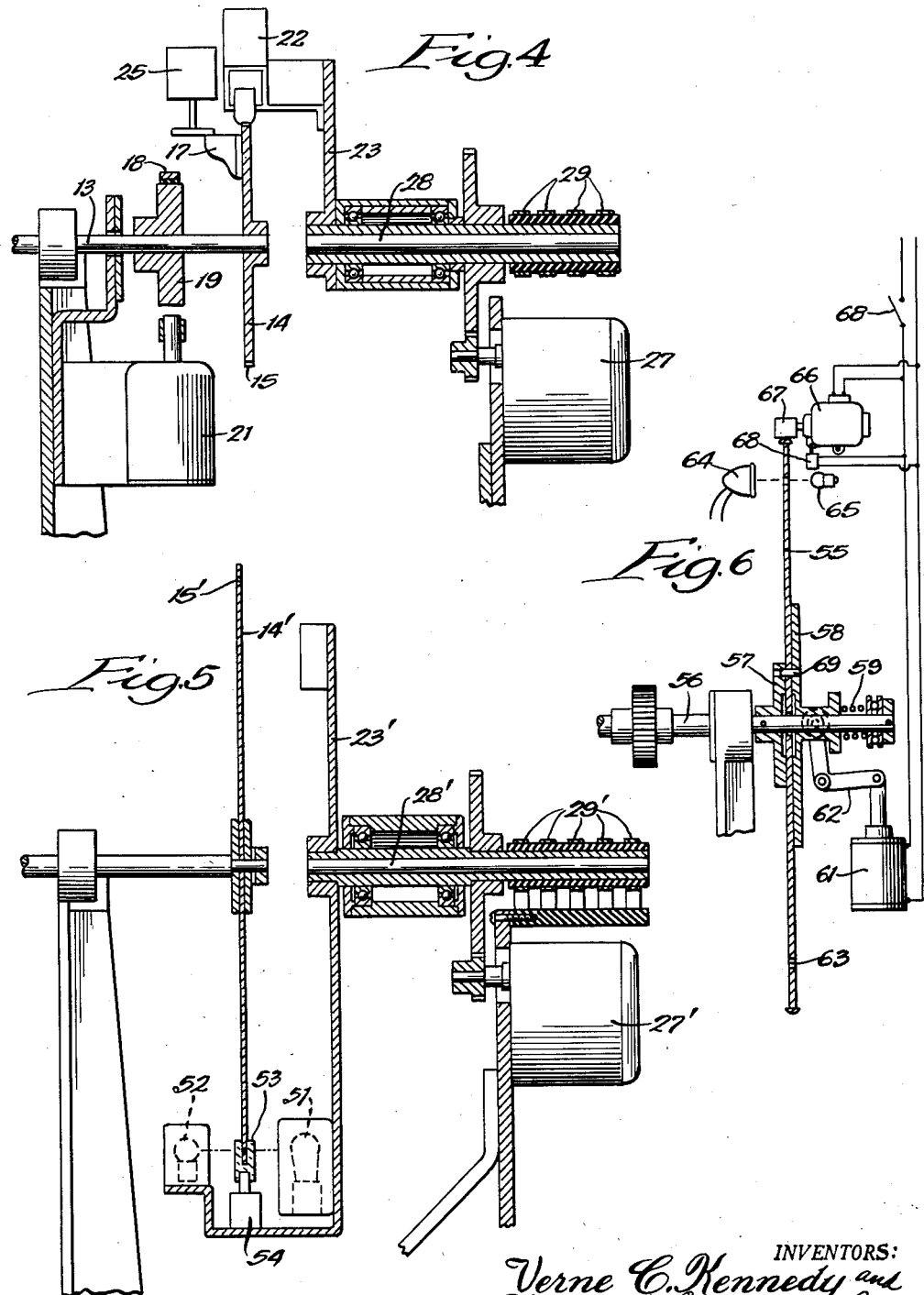

Patented Dec. 30, 1952

2,623,936

UNITED STATES PATENT OFFICE 2,623,936

DIGITAL COUNTING APPARATUS

Verne C. Kennedy and Verne C. Kennedy, Jr., Evanston, Ill., assignors to Streeter-Amet Company, Chicago, Ill., a corporation of Illinois Application December 3, 1949, Serial No. 130,886

8 Claims. (Cl. 177—351)

1

This invention relates to digital counting apparatus and more particularly to an apparatus for producing a digital indication of a movement at a remote point. Specifically the invention is applicable for use with weighing scales to produce a digital indication of the weight.

One of the objects of the invention is to provide a digital counting apparatus in which a digital indication of a measuring value may be indicated at a remote point at any desired time.

Another object is to provide an apparatus in which a digital indication of the displacement of a movable member from its normal position is provided. In the preferred construction the movable member may be a rotatable disc cooperating with a pulse producing means on a carriage and producing a number of pulses proportional to the displacement of the disc from its normal or zero position.

Still another object is to provide an apparatus in which the movable member or disc is held stationary and the carriage rotates around it when an indication is desired. According to one feature of the invention the pulse producing means is made ineffective after a relative movement of the carriage and disc equal to the displacement of the disc from its zero or normal position, and the carriage makes a full revolution around the disc during each indicating operation so that it returns to a position ready for an additional indicating operation when desired.

In an alternative construction according to the invention the disc may be disconnected from the means which moves or displaces it and may be driven from its displaced position back to its zero or normal position to produce an indication.

A further object is to provide a digital counting apparatus which is electrically operated so that it can produce an indication at any desired point. Preferably the apparatus produces a series of electrical pulses which can be counted and indicated or recorded in any desired manner.

The above and other objects and advantages of the invention will be more readily apparent when read in connection with the accompanying drawings, in which —

Figure 4 is a partial longitudinal section of the apparatus of Figure 1;

2

Figure 1:
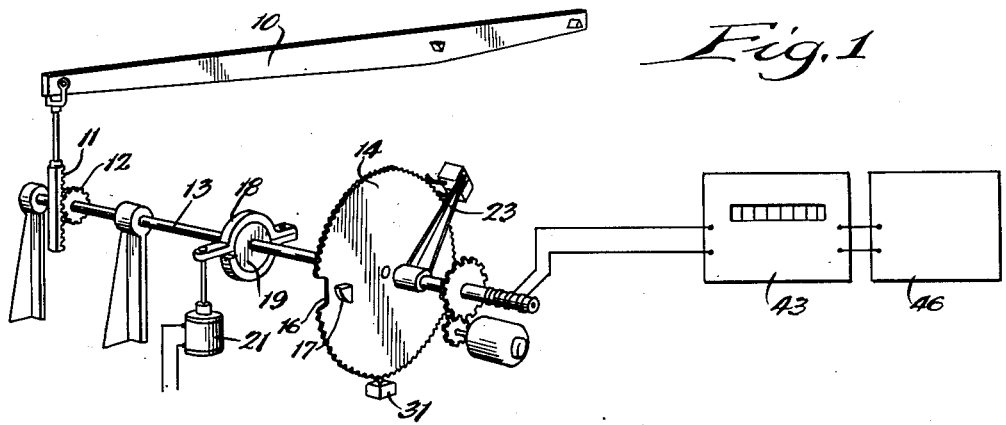
Figure 1 is a diagrammatic perspective view illustrating one form of apparatus embodying the invention.

Figures 5 and 6 are views similar to Figure 4 illustrating alternative constructions;

The apparatus, as shown, is adapted to be used in connection with a weighing scale of any desired type to provide a digital indication of the weight on the scale which can be indicated or recorded at any desired remote point from the scale. As shown in Figure 1, the scale includes a balance beam 10 which may be connected to the usual scale mechanism to be moved thereby an amount proportional to the weight on the scale. One end of the beam is connected to a rack 11 meshing with a pinion 12 on a shaft 13 so that the shaft will be turned an amount proportional to the weight. The indicating apparatus, as shown, is adapted to measure the displacement of the shaft periodically thereby to obtain an indication or a record of the weight on the scale at the time the measurement is taken.

As shown, the shaft 13 has rigidly connected thereto an enlarged circular disc 14 formed on its periphery with a series of projecting teeth 15 forming spaced indicating elements. The teeth 15 are preferably uniformly spaced and may be of any desired size, although they are preferably relatively small so that a large number of teeth may be provided. At the point corresponding to its zero position the disc is formed with an enlarged notch 16 and has a cam projection 17 secured thereto preferably opposite the notch 16. The disc is adapted to be held stationary during an indicating operation by a brake 18 engageable with a brake drum 19 on the shaft 13. A solenoid 21 is connected to the brake to apply it thereby to hold the disc stationary when the solenoid is energized.

The teeth 15 on the periphery of the disc cooperate with a switch 22 mounted on a carriage or arm 23 and having a finger 24 engageable with the teeth 15. The switch 22 is preferably normally open when the finger lies between adjacent indicating projections 15 and is closed each time the finger is moved outward by a projection during relative movement of the disc and the switch 22. In this way the switch 22 forms a counting means to produce a series of pulses proportional to the amount of relative movement between the disc and the carriage 23. When the switch 22 is opposite the zero recess 16 in the disc, it will remain open for a brief interval for a purpose to appear more fully hereinafter.

The carriage also carries a control switch 25 having an operating finger 26 thereon positioned to engage the cam projection 17 on the disc. The switch 25 is normally open and is closed when the finger 26 engages the cam 17 to interrupt the pulse producing mechanism.

Figure 2:
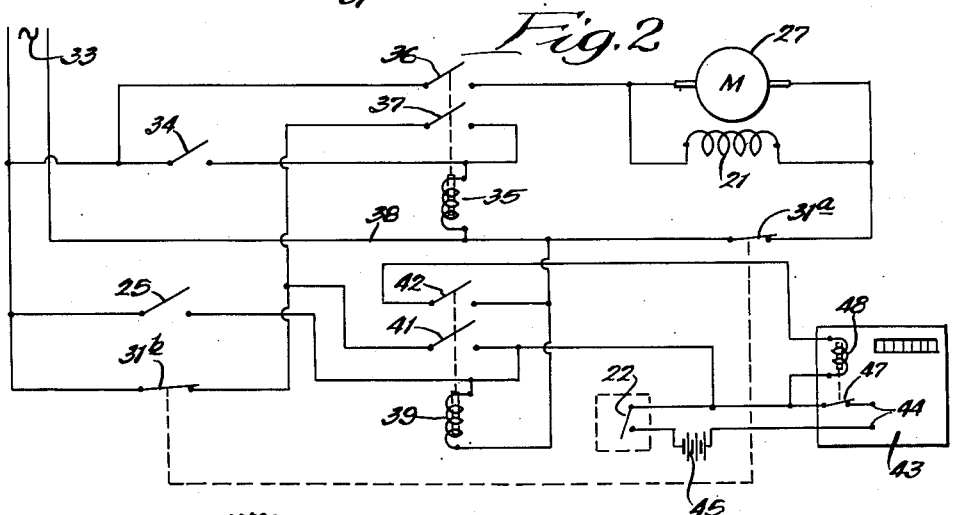
Figure 2 is a circuit diagram of the apparatus of Figure 1.
Figure 3:
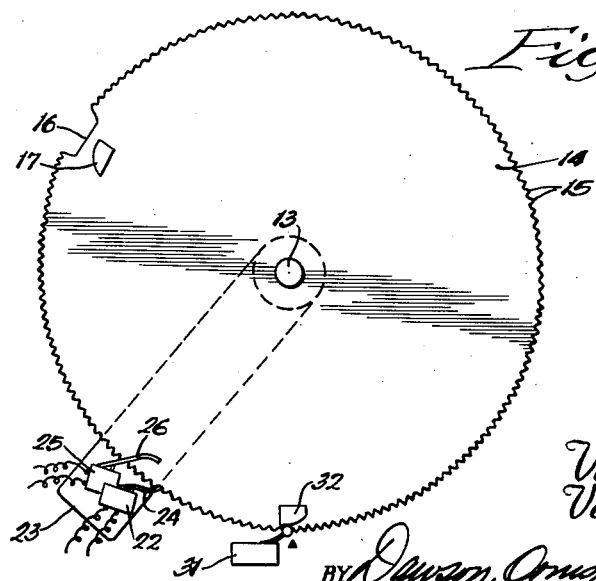
Figure 3 is a side elevation of the disc and carriage of Figure 1 illustrating the control switches.

In the form shown in Figures 1 to 4 the carriage 23 is adapted to be driven around the disc through a complete revolution, each time an indication is desired, by a motor 27. As best seen in Figure 4, the motor is geared to a shaft 28 on which the arm or carriage 23 is mounted so that when the motor runs the arm will be turned around the disc 14. The shaft 28 may also carry a series of contact rings 29 for making circuit connections to the motor 27 and the switches 22 and 25. To insure that the carriage will always stop at the same normal or zero position, a stop switch 31 is mounted adjacent the carriage 23 to be engaged by the carriage and opened when the carriage reaches its normal position. As shown in Figure 3, the carriage would be in its normal position when it extends straight downward from the shaft 13. A fixed ramp member 32 is also mounted adjacent the zero position of the carriage to engage the finger 24 of the switch 22 to hold it out of engagement with the projections 15 so that at this time the disc 14 can turn freely without interfering with the switch 22. The stop switch 31 includes two interconnected contacts, as indicated at 31a and 31b, and which are normally closed, as indicated in the wire diagram, Figure 2.

The several switches, the motor 27, and the solenoid 21 may be connected in circuit as indicated in the circuit diagram, Figure 2. As shown, the circuit is powered from any suitable source 33 which may be a conventional city power supply. One side of the power supply is connected through a manual starting switch 34 to a relay 35 which when energized closes two switches 36 and 37. The other side of the relay 35 connects to a main return line 38 leading to the other side of the source of power. The switch 37 comprises a holding switch for the relay 35 and is connected to the first side of the power supply through the switch contact 31b, as shown. The switch 36 connects the first side of the source to the motor 27 and brake solenoid 21, both of these elements being connected to the main return circuit 38 through the switch contact 31a.

The switch 25 connects the first mentioned side of the source to a relay 39, the opposite side of which is connected to the main return line 38. The relay 39 when energized closes two switch contacts 41 and 42. The contact 41 constitutes a holding switch connecting the relay 39 to the source through the switch contact 31b. The switch 42 is a cut-off switch for an indicating or recording apparatus indicated generally at 43. As shown, this apparatus has a pair of pulse input terminals 44 connected through the switch 22 to a suitable source 45 so that every time the switch 22 is closed a pulse will be transmitted to the counting device 43 to be indicated.

As shown in Figure 1 a separate recorder 46 may be connected to the counting device 43 to record and totalize the weights, if desired.

The switch 22 is connected to the counting device 43 through a normally closed switch 47 which is adapted to be opened by a coil 48 when the coil 48 is energized. One side of the coil 48 is connected as shown to the switch 41 so that it will be connected to the first mentioned side of the source 33 when the switch 25 is closed or when switches 41 and 31b are closed. The opposite end of the coil 48 is connected through the switch 42 to the main return line 38.

In operation of the apparatus as so far described, when there is no weight on the scale the disc 14 will occupy its normal or zero position with the notch 16 and cam projection 17 at the bottom. The carriage 23 will also be at the bottom. In the normal position of the electrical circuit the switches 34 and 25 are opened, as shown, so that the relays 35 and 39 are deenergized. If a weight is now placed on the scale the beam 10 will be deflected and will turn the shaft 13 and disc 14 through an angle proportional to the weight. Under these conditions the parts may occupy approximately the position shown in Figure 1.

When it is desired to obtain an indication or a record of the weight on the scale, the operator may close the starting switch 34 which may be located at any convenient position to energize the relay 35. This will close the switches 36 and 37 to complete a holding circuit through the relay to maintain it energized after the switch 34 is released. Simultaneously the brake solenoid 21 will be energized to engage the brake 18, and the motor 27 will be started. The motor will drive the carriage 23 clockwise around the disc, as seen in Figures 1 and 3, so that the switch 22 will be opened and closed by the projections 15 to produce a series of pulses which will be transmitted to the pulse counting means 43 to be indicated or recorded. When the carriage reaches a position registering with the notch 16 and cam projection 17, the switch 22 will remain open during movement of its finger 24 through the notch 16 and during this interval the cam projection 17 will close the switch 25. This will energize the relay 39 to close the holding switch 41 and the switch 42. The latter switch completes a circuit through the coil 48 to open the switch 47 in the pulse circuit so that no further pulses will be transmitted to the counting means as the carriage continues to turn. Thus the apparatus will produce a number of pulses directly proportional to the displacement of the disc from its normal position so that an accurate digital indication or record of the weight on the scale will be produced at the pulse counting means.

As the carriage continues to rotate, it will reach its lower most position where it engages and opens the switch 31 and at the same time engages the operating finger 24 of the switch 22 with the fixed ramp 32 to hold it out of engagement with the disc. Opening of the switch contacts 31a and 31b interrupts the holding circuits to the relays 35 and 39 so that their switches will open and at the same time deenergize the motor and the brake solenoid 21. Thus the apparatus is returned to its normal position as shown ready for an additional indication.

Whenever it is desired to indicate or record the weight on the scale, the operation as described may be repeated, and, if desired, the pulse counting means may include a totalizing recorder to indicate the total weight of a number of different batches or units. It will be understood that when the weight is removed from the scale the disc 14 will return to its normal or zero position ready to be displaced when an additional weight is placed on the scale.

Figure 5 illustrates a modified construction in which the pulses are counted photoelectrically rather than through a mechanical switch as in Figures 1 to 4. In this construction the disc 14' is provided at its periphery with a series of spaced holes 15' forming indicating elements. The carriage comprises a counter-weighted arm 23' mounted on a shaft 28' which is driven through suitable gearing by the motor 27'. Circuits to the motor and pulse producing means may be provided through conducting rings 29' on the shaft 28'.

The mechanism for producing the pulses as shown comprises a light source 51 mounted on the carriage at one side of the disc and aligned through the openings 15' with a photoelectric cell 52 on the opposite side of the disc. With this construction as the disc and carriage rotate relative to each other a series of short light flashes will be transmitted to the photocell so that it will produce a series of electrical pulses in the same manner as the mechanical switch 22 of Figures 1 to 4. To interrupt the pulses at the desired point the disc carries a cam member 53 at its periphery to engage and close a switch 54 on the carriage corresponding to the switch 25 of Figures 1 to 4. Except for the manner of producing the electrical pulses the construction of Figure 5 is the same as that of Figures 1 to 4 and operates in the same manner.

Figure 6 illustrates an alternative construction functioning in a slightly different manner. In this construction a disc 55 is loosely mounted on a shaft 56 which is adapted to be displaced by the scale mechanism in the same manner as the shaft 13. The shaft carries a clutch flange 57 at one side of the disc 55 and a slidable clutch flange 58 at the other side of the disc through which the disc may be connected to the shaft 56 when the clutch is engaged. The clutch is normally urged into engagement by a spring 59 and may be disengaged by a solenoid 61 connected through a yoke mechanism 62 to the clutch plate 58.

The disc 55 is formed with a series of spaced indicating elements shown as openings 63 through which light from a source 64 may project on to a photoelectric pick up unit 65. The pick up unit 65 may be connected to a counting and indicating or recording mechanism through circuits such as those shown in Figure 2.

In this construction the disc is adapted to be driven from its displaced position back to its normal or zero position when an indication is desired. For this purpose a motor 66 is provided pivotally mounted adjacent the disc and having a driving roller 67 engageable with the periphery of the disc. The motor is normally tilted to a position in which the roller 67 is out of engagement with the disc and is adapted to be tilted to a position with the roller engaging the disc by a solenoid 68.

The motor and the solenoids 61 and 68 may be controlled through circuits similar to those shown in Figure 2 so that they will be energized substantially simultaneously when an indication is desired. As illustrated diagrammatically, the motor and the two solenoids are connected in parallel to a power source through a switch 68 which may correspond to the relay switch 36 of Figure 2.

In normal operation the clutch is engaged to connect the disc 55 to the shaft 56 so that the disc will be turned as the shaft turns. When an indication is desired, the switch 68 is closed to energize solenoid 61 to disengage the clutch, to energize solenoid 68 to move the driving roller 67 into engagement with the disc and to start the motor. The motor runs in a direction to turn the disc from its displaced position back to its normal or zero position, and during this time electrical pulses will be produced by the photoelectric device 65 which will be counted and indicated or recorded by the counting means. When the disc reaches its zero position, a suitable stop cam thereon will interrupt the circuit to stop the motor and deenergize the solenoids. Preferably, a clutch is employed which can engage in only one position as by providing a pin 69 on the plate 58 to enter an opening in the disc 55. Thus the clutch will not reengage immediately when the solenoid 61 is deenergized but will remain open to permit relative rotation between the shaft 56 and the disc 55 until the shaft has again returned to its zero or normal position. At this time the clutch will reengage and the mechanism is in condition for a subsequent weighing operation.

While several embodiments of the invention have been shown and described in detail herein, it will be understood that they are illustrative only and are not to be taken as a definition of the scope of the invention, reference being had for this purpose to the appended claims.

What is claimed is:

1. Digital indicating apparatus comprising a movable member having a series of spaced indicating elements thereon, means responsive to a condition to be indicated to move the member from its normal position an amount proportional to the value of the condition, a carriage mounted adjacent to the member for movement relative thereto and having a normal zero position relative to the member, counting means on the carriage cooperating with said indicating elements to produce a series of pulses upon relative movement of the member and carriage, a motor for moving the carriage and the member relative to each other in a direction to return them to their relative normal zero position, means for simultaneously energizing the motor and the counting means, and a counting device connected to the counting means to count the pulses produced thereby.

2. Digital indicating apparatus comprising a movable member having a series of spaced indicating elements thereon, means responsive to a condition to be indicated to move the member from its normal position an amount proportional to the value of the condition, a carriage mounted adjacent to the member for movement relative thereto and having a normal zero position relative to the member, counting means on the carriage cooperating with said indicating elements to produce a series of pulses upon relative movement of the member and carriage, a motor for moving the carriage and the member relative to each other a distance equal to the full permissible amount of relative movement, means for simultaneously energizing the motor and the counting means, cooperating parts on the member and the carriage to de-energize the counting means after relative movement between the member and carriage equal to the displacement of the member from its normal position, and a counting device connected to the counting means to count the pulses produced thereby.

3. Digital indicating apparatus comprising a movable member having a series of spaced indicating elements thereon, means responsive to a condition to be indicated to move the member from its normal position an amount proportional to the value of the condition, a carriage mounted adjacent to the member for movement relative thereto and having a normal zero position relative to the member, counting means on the carriage cooperating with said indicating elements to produce a series of pulses upon relative movement of the member and carriage, a clutch connecting the member to its moving means, a motor to move the member from its displaced position to its normal position, means for simultaneously energizing the motor and counting means and disengaging the clutch, and a counting device connected to the counting means to count the pulses produced thereby.

4. Digital counting apparatus comprising a rotatable disc having a series of spaced indicating elements thereon, means responsive to a condition to be indicated to turn the disc from a normal position an amount proportional to the value of the condition, a carriage mounted adjacent to the disc and having a normal zero position relative to the disc, counting means on the carriage cooperating with the indicating elements to produce a series of pulses upon relative rotation of the carriage and disc, a motor to move the carriage and disc relative to each other in a direction to return them to their relative normal zero position, means for simultaneously energizing the motor and counting means, and a counting device connected to the counting means to count the pulses produced thereby.

5. Digital counting apparatus comprising a rotatable disc having a series of spaced indicating elements thereon, means responsive to a condition to be indicated to turn the disc from a normal position an amount proportional to the value of the condition, a carriage mounted adjacent to the disc and having a normal zero position relative to the disc, counting means on the carriage cooperating with the indicating elements to produce a series of pulses upon relative rotation of the carriage and disc, a motor to turn the disc and counting means relative to each other through a full revolution, means to simultaneously energize the motor and counting means, cooperating parts on the disc and carriage to de-energize the counting means after relative movement between the disc and carriage equal to the displacement of the disc from its normal position, and a counting device connected to the counting means to count the pulses produced thereby.

6. Digital counting apparatus comprising a rotatable disc having a series of spaced indicating elements thereon, means responsive to a condition to be indicated to turn the disc from a normal position an amount proportional to the value of the condition, a carriage mounted adjacent to the disc, counting means on the carriage cooperating with the indicating elements to produce a series of pulses upon relative rotation of the carriage and disc, a motor to turn the disc from its displaced position to its normal position, a clutch to connect the disc to the turning means, means to simultaneously energize the motor and counting means and disengage the clutch, and a counting device connected to the counting means to count the pulses produced thereby.

7. Digital counting apparatus comprising a rotatable disc having a series of spaced switch actuating elements thereon, means responsive to a condition to be indicated to turn the disc from a normal position an amount proportional to the value of the condition, a carriage mounted adjacent to the disc, electrical switch means on the carriage cooperating with the switch actuating elements to produce a series of electrical pulses on relative movement of the disc and carriage, an electric motor to move the disc and carriage relative to each other, a motor switch to control the motor, an electrical pulse counting device, a circuit including a control switch connecting the counting device to the switch means, and electrical means for simultaneously closing the motor switch and the control switch.

8. Digital counting apparatus comprising a rotatable disc having a series of spaced switch actuating elements thereon, means responsive to a condition to be indicated to turn the disc from a normal position an amount proportional to the value of the condition, a carriage mounted adjacent to the disc, electrical switch means on the carriage cooperating with the switch actuating elements to produce a series of electrical pulses on relative movement of the disc and carriage, an electric motor to move the disc and carriage relative to each other, a motor switch to control the motor, an electrical pulse counting device, a circuit including a control switch connecting the counting device to the switch means, a control circuit including an operating switch to open the control switch, electrical means for simultaneously closing the motor switch and the control switch, and means on the disc engaging the operating switch when the disc and carriage are in their normal relative positions to open the control switch.

VERNE C. KENNEDY.
VERNE C. KENNEDY, Jr.

REFERENCES CITED

The following references are of record in the file of this patent:

UNITED STATES PATENTS

| Number | Name | Date |
|---|---|---|
| 2,024,793 | Bauml | Dec. 17, 1935 |
| 2,168,149 | Arnold | Aug. 1, 1939 |
| 2,176,720 | Rayner | Oct. 17, 1939 |
| 2,240,937 | McNaney | May 6, 1941 |
| 2,328,304 | Sorensen | Aug. 31, 1943 |
| 2,411,513 | Bergier | Nov. 26, 1946 |
| 2,419,487 | Dresser | Apr. 22, 1946 |
| 2,436,785 | Bergier | Mar. 2, 1948 |